United States Patent Office 3,255,149
Patented June 7, 1966

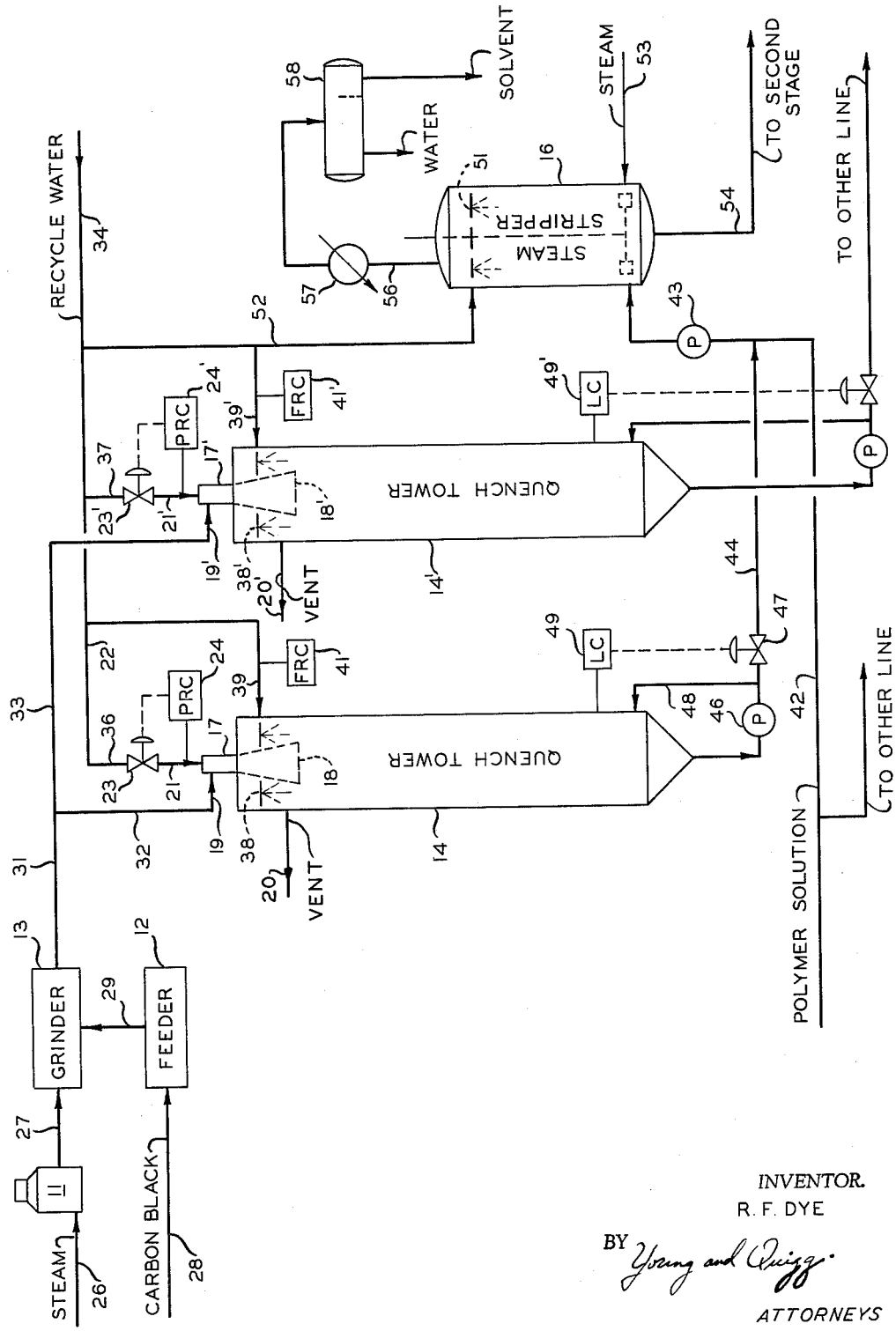

3,255,149
PREPARATION OF PLURALITY OF PIGMENT DISPERSION STREAMS AND USE OF SAME IN POLYMER MASTERBATCHING
Robert F. Dye, Bartlesville, Okla., assignor to Phillips Petroleum Company, a corporation of Delaware
Filed Jan. 22, 1962, Ser. No. 167,669
10 Claims. (Cl. 260—41.5)

This invention relates to preparation of a plurality of pigment dispersion streams and use of same in polymer masterbatching.

Pigments, such as carbon black and zinc oxide, have been widely used as polymer additives. For instance, carbon black is used to a great extent in rubber compounding wherein it serves as a pigment and a reinforcing agent. One of the most common methods of incorporating such a pigment in rubber has been to mill the materials together after coagulation of the rubber. It has also been suggested to prepare a masterbatch of rubber and pigment by mixing the rubber as a solution or dispersion with the pigment dispensed in the same or a different liquid. In such operation, the carbon black or other pigment can be dispersed in a liquid either by maintaining the mixture under severe agitation or by using dispersing agents. In some products, it is desired to avoid the presence of a dispersing agent.

These latter systems have been quite satisfactory even though expensive equipment is necessary for the preparation of the slurry of the pigment in a liquid. Carbon black is particularly difficult to weigh, feed, and disperse in the liquid. Consequently, fairly complicated metering and mixing systems have been used.

It is an object of my invention to simplify the production of a pigment slurry where several slurries are used at one location. A further object of my invention is to provide an improved process by which rubber or other polymer can be masterbatched with carbon black. A further object of my invention is to provide apparatus for preparing a plurality of pigment slurries of the same or different composition. A further object of my invention is to provide apparatus for carrying out the above processes.

These and other objects of my invention will be apparent to one skilled in the art upon reading this disclosure which includes A drawing, showing in schematic form, apparatus suitable for practicing my invention.

Broadly, the invention comprises a process for preparing a pigment slurry and supplying same to a plurality of points for utilization comprising dispersing said pigment in superheated vapor, the total amount of pigment being regulated to supply the total amount required for said plurality of points, dividing the pigment laden vapor stream into a number of secondary streams corresponding to the number of points of utilization, passing each of said secondary streams to a separate liquid eduction zone, supplying liquid to each said liquid eduction zone, and controlling the amount of liquid feed to each said eduction zone in proportion to the amount of pigment desired for each said point of utilization. In a more limited aspect, my invention comprises the above process wherein steam is used as the superheated vapor and the liquid supplied to the eduction zone is water. Toluene, or other polymer solvent, can be used in place of the steam. In a further aspect, the invention resides in the above process combined with the additional steps of mixing each of the plurality of slurries with a polymer dispersion or solution and recovering a masterbatch of the polymer and pigment.

In yet another aspect, my invention resides in apparatus for preparing a plurality of pigment slurries comprising grinding means, means to supply vapor to said grinding means, means to supply pigment to said grinding means, means to divide the output of said grinding means into a plurality of streams, and means to quench each of the plurality of streams into which the output of said grinding means has been divided, and the use of this apparatus in combination with a polymer supply and masterbatch recovery means.

My invention can probably be best understood from the accompanying drawing which shows, in schematic form, apparatus for carrying out the process of my invention. The principal elements shown include a steam superheater 11, a pigment feeder 12, a grinder 13, quench towers 14 and 14' and steam stripper 16. Each of the quench towers 14 and 14' are identical and each is connected with the same auxiliary apparatus. Thus, it is necessary to discuss only one of these towers in detail, the corresponding element in the second tower having the same number with a prime. In the upper end portion of quench tower 14 there is provided an eductor 17 having an outlet 18, a vapor supply inlet 19 and a liquid supply inlet 21. Vent 20 extending from the upper portion of tower 14 prevents build up of inerts in the system. Conduit 22 extends to the liquid inlet 21 of eductor 17 and valve 23 is provided therein. A pressure recorder controller 24 measures the pressure in inlet 21 and adjusts valve 23 to a predetermined figure. A flow recorder controller system can be used to control flow in inlet 21. A steam supply conduit 26 extends into the inlet of superheater 11 and conduit 27 extends therefrom to grinder 13. The various types of grinders are suitable for use in dispersing and grinding pigments, one suitable one being the "Jet-O-Mizer," a product of Fluid Energy Processing and Equipment Company. Conduit 28 extends to feeder 12, feeder 12 being primarily a solid material weighing and feeding system such as are well known in the art. Conduit 29 extends from feeder 12 to grinder 13.

Extending from the outlet of grinder 13 is conduit 31, this conduit branching into conduits 32 and 33 which extend, respectively, to vapor inlets 19 and 19' of eductors 17 and 17'. Recycle water, recovered from a point downstream in the process is supplied by conduit 34, this extending to conduits 36 and 37 which extend, respectively, to inlets 21 and 21' of eductors 17 and 17'. The quench towers are also provided with spray means 38 and 38', these being supplied by conduits 39 and 39'. Flow in these last mentioned conduits is controlled by flow recorder controllers 41 and 41'.

The masterbatch recovery process shown in this figure comprises the first steam stripper of a multiple stage steam stripping operation such as that disclosed in Crouch application Serial No. 30,817 filed May 23, 1960, now Patent No. 3,092,637. While a series of steam strippers can be used, only stripper 16 is shown in the present drawing since the type of masterbatch recovery does not constitute an essential feature of my invention.

Polymer solution supply conduit 42 extends to the lower end portion of stripper 16, this conduit including a mixing pump 43. Conduit 44, having pump 46 and valve 47 therein, extends from the lower end portion of quench tower 14 to conduit 42 at a point upstream of pump 43. Recycle line 48 extends from conduit 44 to the lower end portion of quench tower 14. A liquid level controller 49 is adapted to measure the level in quench tower 14 and to adjust valve 47 in line 44.

In the operation of this apparatus, using the preparation of a rubber-black masterbatch as an example, carbon black is dispersed in superheated steam in grinder 13. This vapor stream, carrying the black dispersed therein, is fed to eductors 17 and 17'. In these eductors, the pigment is metered according to the amount needed subsequently in the process. The total amount required is, of course, fed by feeder 12 and the stream is divided by settings of pressure recorder controllers 24 and 24'. Final quenching takes place in towers 14 and 14'. The resulting slurry is mixed with the polymer in conduit 42 and passed to stripper 16. A low level of slurry is maintained in each of the quenched towers and the pigment is maintained dispersed by circulation out of the outlet with a return of the slurry not needed in the process. This level is maintained by level controller 49 which adjusts valve 47 in conduit 44.

The elements associated with the lower portion of quench tower 14' are the same as those associated with tower 14 and operate in the same manner.

Water is sprayed into the top of stripper 16 by means of sprays 51, the water being sprayed by conduit 52. Steam supply line conduit 53 extends from the upper end portion of the second stripper, not shown. The product outlet from stripper 16 is passed to the second stripper, not shown, by means of conduit 54. In the stripper, a vapor overhead is taken overhead by conduit 56, condensed in heat exchanger 57, and separated into components in accumulator 58, the water being available for reuse as is the solvent.

The second stripper line corresponds to that shown and the outlet from quench tower 14' is used to supply the pigment slurry to this other line.

A number of advantages are obtained by the use of this system. The first of these is that recycle water is utilized to make the pigment slurry. This avoids the use of fresh water which is costly. Also, this recycle water is used to operate the eductors which in turn divides the pigment according to the amount desired for each recovery line. Metering after preparing a slurry is difficult because the concentration of pigment in the liquid varies considerably. It is also apparent that reduced apparatus is involved since several recovery lines can be operated while only one superheater, one feeder and one grinder are necessary. Previous operation has involved the use of separate slurrying apparatus for each recovery line. Contacting of the stream containing vapor and black with the liquid in the quench towers is an extremely efficient arrangement which reduces vapor losses when compared to more conventional arrangements.

The process of the present invention is applicable to the treatment of a large number of polymeric materials in order to prepare a mixture of the polymer and a pigment. For convenience, the invention is primarily discussed as it relates to the masterbatching of rubber. Even within the broad definition of rubber, many variations are possible. More specifically, the invention can be used with either a dispersion or solution of the rubber. Dispersions of rubber are represented by latex. Rubbers which are produced in latex include those produced by the emulsion polymerization of various monomers. The butadiene/styrene latex is probably the best known example. However, other dienes containing 4 to 8 carbon atoms can be used such as isoprene, 1,3-pentadiene, 1,3-hexadiene, and 1,3-octadiene. Such conjugated dienes are frequently polymerized with monomers containing the $CH_2=C<$ group such as styrene, the various methyl styrenes, halogen substituted styrenes, acrylonitrile, methyl vinyl ether, methyl vinylpyridine, and the like. Such polymers are prepared in aqueous dispersion using, generally, a larger portion of the diene and a minor portion of the comonomer.

The invention is also applicable to dispersions of butyl rubber, the most common example being a copolymer of at least 90 percent isobutylene with the remainder of the monomer system being isoprene.

Another important type of rubber which can be used in the present system are rubbers produced in solution with catalysts directing the polymerization so that substantially all one type of structure is obtained. Examples of such products include cis-polybutadiene, trans-polybutadiene, cis-polyisoprene and trans-polyisoprene. Other polymers produced by the catalysts hereinafter described contain substantial amounts of two or more types of configuration.

Organic solvents used in the solution polymerization include paraffins, cycloparaffins and aromatic hydrocarbons which are relatively inert, non-deleterious to the catalyst and liquid under the conditions of the process. Examples include the paraffin hydrocarbons such as propane, butane, pentane, isooctane; cycloparaffins, such as cyclohexane, methylcyclohexane; and aromatic compounds, such as benzene, toluene, and the like. The solvent is one which is normally liquid, which will dissolve the polymer, and which can be vaporized in the presence of steam or hot water.

A large number of initiator system are suitable for the production of the polymers.

One type of initiator system is a two or more component catalyst wherein one component is an organometal compound, including those where one or more organo groups is replaced by a halogen; a metal hydride; or a metal of Group I, II or III; and the second component is a Group IV to VI compound, e.g., salt or alcoholate. This type of initiator system is fully described with a group of examples in columns 5 through 8 of Patent 2,886,561 dated May 12, 1959.

Another initiator system which is suitable involves the use of a compound of the formula $R(Li)_x$, wherein R is a hydrocarbon radical selected from the group consisting of aliphatic, cycloaliphatic and aromatic radicals and combinations of these radicals and $x$ is an integer from 1 to 4, inclusive. The aliphatic and cycloaliphatic radicals can be saturated or contain olefinic unsaturation. The R in the formula has a valence equal to the integer, and preferably contains from 1 to 20, inclusive, carbon atoms, although it is within the scope of the invention to use higher molecular weight compounds. Examples of these compounds include methyllithium,
isopropyllithium,
n-butyllithium,
tert-octyllithium,
n-decyllithium,
phenyllithium,
naphthyllithium,
4-butylphenyllithium,
p-tolyllithium,
4-phenylbutyllithium,
cyclohexyllithium,
4-butylcyclohexyllithium,
4-cyclohexylbutyllithium,
dilithiomethane,
1,4-dilithiobutane,
1,10-dilithiodecane,
1,20-dilithioeicosane,
1,4-dilithiocyclohexane,
1,4-dilithio-2-butane,
1,8-dilithio-3-decene,
1,4-dilithiobenzene,
1,5-dilithionaphthalene,
1,2-dilithio-1,2-diphenylethane,
9,10-dilithio-9,10-dihydroanthracene,
1,2-dilithio-1,8-diphenyloctane,
1,3,5-trilithiopentane,
1,5,15-trilithioeicosane,
1,3,5-trilithiocyclohexane,
1,2,5-trilithionaphthalene,
1,3,5-trilithioanthracene,
1,3,5,8-tetralithiodecane,
1,5,10,20-tetralithioeicosane,
1,2,4,6-tetralithiocyclohexane,
1,2,3,5-tetralithio-4-hexylanthracene
1,3-dilithio-4-cyclohexene,
and the like.

The amount of organolithium initiator employed can vary over a broad range. In general, the amount of initiator used will be in the range from 0.3 to 100 milliequivalents of lithium per 100 parts by weight of total monomers charged and will preferably be in the range from 0.6 to 15 milliequivalents of lithium per 100 parts by weight of total monomers charged. When n-butyllithium is employed as the initiator for the production of an easily processable 40 to 60 Mooney rubber (ML-4 at 212° F.), the quantity of initiator required will generally be in the range from 2 to 2.4 millimoles per 100 parts of total monomers charged.

Still another initiator system utilizes a cobalt compound and an alkyl metal or alkyl metal halide wherein one but not all of the alkyl groups can be replaced by halogen. The Group III metals, as exemplified by aluminum, are used to provide the metal alkyl component. Examples of these organometal compounds include trialkylaluminums, such as triethylaluminum dichloride and diethylaluminum chloride. For the cobalt compound, the cobaltous form is preferred. Examples of these compounds include cobaltous chloride, cobaltous sulfate, cobaltous nitrate, and the salts of organic acids, such as cobaltous acetate.

Some of the systems included within the above description have been found particularly suitable for the production of polymers having particular molecular configuration. For instance, polybutadiene having 85 to 100 percent of the polymer formed by cis 1,4-addition can be prepared using initiator in systems comprising triisobutylaluminum and titanium tetraiodide; triisobutylaluminum, titanium tetrachloride, and iodine; and triisobutylaluminum, titanium tetraiodide, and titanium tetrachloride. Polybutadiene having 70 to 100 percent of the polymer formed by trans-1,4-addition can be prepared using an initiator system comprising lithium aluminum hydride and titanium tetraiodide. The catalyst system comprising lithium aluminum hydride and titanium tetrachloride produces a polybutadiene having a major amount of the polymer formed by 1,2-addition. Similar products are obtained using isoprene except that a portion of the product can be formed by 3,4-addition.

To determine the amount of the addition of the various types, the polymers can be dissolved in carbon disulfide to form a solution having 20 grams of polymer per liter of solution. The infrared spectrum of such a solution (percent transmission) is then determined in a commercial infrared spectrometer.

The percent of the total unsaturation present as trans 1,4- is calculated according to the following equation and consistent units:

$$\epsilon = E/tc$$

where:

$\epsilon$ = extinction coefficient (liters-mols$^{-1}$-microns$^{-1}$);
$E$ = extinction (log $Io/I$);
$t$ = path length (microns); and
$c$ = concentration (mols double bond/liter).

The extinction is determined at the 10.35 micron band and the extinction coefficient used is $1.21 \times 10^{-2}$ (liters-mols$^{-1}$-microns$^{-1}$).

The percent of the total unsaturation present as 1,2- (or vinyl) is calculated according to the above equation, using the 11.0 micron band and an extinction coefficient of $1.52 \times 10^{-2}$ (liters-mols$^{-1}$-microns$^{-1}$).

The percent of the total unsaturation present as cis 1,4- is obtained by subtracting the trans 1,4- and 1,2- (vinyl) determined according to the above methods from the theoretical unsaturation assuming one double bond per each $C_4$ unit in the polymer.

The concentration of the rubber in the dispersion or solution can vary considerably. Most dispersions or latices contain approximately 10 to 40 percent solids and these are suitable. For the treatment of solutions of rubbers, it is preferred to operate in the range of 1 to 25 percent rubber by weight, the most important feature being the viscosity of the solution. If difficulty in mixing is obtained, solutions for dispersions in the lower portion of the ranges given should be used.

The following example illustrates a specific operation according to my invention but should not be considered unduly limiting.

EXAMPLE

In one run, a solution of cis-polybutadiene (approximately 95% cis content) prepared in the presence of a triisobutylaluminum/iodine/titanium tetrachloride polymerization catalyst was concentrated to give a solution containing 15 percent rubber in toluene. This is the feed stream to the process. High abrasion furnace black is metered to the system and ground by contacting it with steam at a pressure of 180 p.s.i.g. (600° F.). This stream is fed to the quench towers, being divided equally therebetween, this division being made by adjusting the valves in the water supply lines to the two educators. The product from the quench tower is mixed with the rubber solution and stripped in a 2-stage stripping operation. The first stripper is operated at 15 p.s.i.a. and a temperature of 205° F. A material balance upon this system is shown in the following table, all amounts being set forth in pounds per stream day.

| Conduit | Steam | Carbon Black | Water | Polymer | Toluene |
|---|---|---|---|---|---|
| 27 | 99,000 | 99,000 | | | |
| 32 | 49,500 | 49,500 | | | |
| 22 | | | 780,000 | | |
| 39 | | | 358,900 | | |
| 42 | | | | 95,080 | 563,380 |
| 44 | | 49,500 | 1,188,400 | | |
| 52 | | | 76,600 | | |
| 56 | | | 375,000 | | 562,700 |
| 54 | | 49,500 | 1,358,900 | 95,080 | 680 |
| 53 | 468,900 | | | | |

As many possible embodiments can be made of this invention without departing from the scope thereof, it is to be understood that all matter herein set forth is to be interpreted as illustrative and not as unduly limiting the invention.

What is claimed is:

1. A process for preparing pigment slurry and supplying same to a plurality of points of utilization comprising dispersing said pigment in superheated vapor, the total amount of pigment being regulated to supply the total amount required for said plurality of points, dividing the pigment laden vapor stream into a number of secondary streams corresponding to the number of points of utilization, passing each of said secondary streams to a separate liquid eductor, supplying liquid to each said liquid eductor, and controlling the amount of liquid fed to each said eductor in proportion to the amount of pigment desired for each said point of utilization.

2. The process of claim 1 wherein said superheated vapor is steam and the liquid supplied to each said eductor is water.

3. In the production of a carbon black-polymer masterbatch wherein each of a plurality of black slurries are individually mixed with each of a plurality of polymer dispersions or solutions, the improvement comprising dispersing the black in superheated vapor, the total amount of black so dispersed being equal to the amount required for the plurality of polymer dispersions or solutions, dividing the black laden vapor stream into a number of secondary streams corresponding to the number of said plurality of polymer dispersions or solutions, passing each of said secondary streams to a separate liquid eductor, supplying liquid to each said liquid educator, controlling the amount of liquid fed to each said liquid educator in proportion to the amount of carbon black desired for each of said polymer dispersions or solutions, mixing each of the resulting black slurries with a polymer dispersion or solution, and recovering a black-polymer masterbatch from each mixture of black slurry and polymer solution or dispersion.

4. In the production of a carbon black-polymer masterbatch wherein each of a plurality of black slurries are individually mixed with each of a plurality of polymer dispersions or solutions, the improvement comprising dispersing the black in superheated steam, the total amount of black so dispersed being equal to the amount required for the plurality of polymer dispersions or solutions, dividing the black laden steam stream into a number of secondary streams corresponding to the number of said plurality of polymer dispersions or solutions, passing each of said secondary streams to a separate liquid eductor, supplying water to each said liquid eductor, controlling the amount of water fed to each said liquid eductor in proportion to the amount of carbon black desired for each of said polymer dispersions or solutions, mixing each of the resulting black slurries with a polymer dispersion or solution, and recovering a black-polymer masterbatch from each mixture of black slurry and polymer solution or dispersion.

5. The process of claim 4 wherein said polymer is selected from the group consisting of cis-polybutadiene, trans-polybutadiene, cis-polyisoprene, and trans-polyisoprene.

6. The process of claim 4 wherein said polymer is a butadiene/styrene latex.

7. Apparatus for preparing a plurality of pigment slurries comprising grinding means; means to supply vapor to said grinding means; means to supply pigment to said grinding means; a plurality of quench towers corresponding in number to the number of slurries desired; an eductor in each of said quench towers having an outlet opening into each of said towers, a vapor inlet, and a liquid inlet, said liquid inlet including flow control means said flow control means controlling the liquid passing through said eductor, and conduit means extending from said grinding means to the vapor inlet of each eductor; spray means in each quench tower; liquid supply means communicating with said spray means, said liquid supply means including a flow recorder controller; liquid supply means communicating with the liquid inlet of each said eductor; and outlet means extending from the lower end portion of each said quench tower.

8. Apparatus for preparing a plurality of carbon black polymer masterbatches comprising grinding means; means to supply vapor to said grinding means; means to supply black to said grinding means; a plurality of quench towers corresponding in number to the number of slurries desired; an eductor in each of said quench towers having an outlet opening into each of said towers, a vapor inlet, and a liquid inlet, said liquid inlet including flow control means including a pressure controller; said flow control means controlling the liquid passing through said eductor, conduit means extending from said grinding means to the vapor inlet of each eductor; spray means in each quench tower; liquid supply means communicating with said spray means, said liquid supply means including a flow recorder controller; liquid supply means communicating with the liquid inlet of each said eductor; a plurality of masterbatch recovery means corresponding in number to the number of masterbatches desired; means to supply a polymer solution or dispersion to each said masterbatch recovery means; mixing means in said last mentioned means; and conduit means extending from the lower end portion of each said quench tower to means to supply said polymer solution or dispersion to masterbatch recovery means upstream of the mixing means therein.

9. In the production of a carbon black-polymer masterbatch wherein each of a plurality of black slurries is individually mixed with each of a plurality of solutions of cis-polybutadiene and toluene, the improvement comprising dispersing the black in superheated steam, the total amount of black so dispersed being equal to the amount required for the plurality of cis-polybutadiene solutions, dividing the black laden steam stream into a number of secondary streams corresponding to the number of said plurality of cis-polybutadiene solutions, passing each of said secondary streams to a separate liquid eductor, supplying water to each said liquid eductor, controlling the amount of water fed to each said liquid eductor in proportion to the amount of carbon black desired for each of said cis-polybutadiene solutions, mixing each of the resulting black slurries with a cis-polybutadiene solution, and recovering a black-cis-polybutadiene masterbatch from each mixture of black slurry and cis-polybutadiene solution.

10. In the production of a carbon black-polymeric masterbatch wherein each of a plurality of black slurries is individually mixed with each of a plurality of solutions of at least one polymer selected from the group consisting of cis-polybutadiene, trans-polybutadiene, cis-polyisoprene, and trans-polyisoprene, wherein the polymer is dissolved in at least one hydrocarbon selected from the group consisting of paraffins, cycloparaffins, and aromatic hydrocarbons, the improvement comprising dispersing the black in superheated steam, the total amount of black so dispersed being equal to the amount required for the plurality of polymer solutions, dividing the black laden steam stream into a number of secondary streams corresponding to the number of said plurality of polymer solutions, passing each of said secondary streams to a separate liquid eductor, supplying water to each said liquid eductor, controlling the amount of water fed to each said liquid eductor in proportion to the amount of carbon black desired for each of said polymer solutions, mixing each of the resulting black slurries with a polymer solution, and recovering a black-polymer masterbatch from each mixture of black slurry and polymer solution.

References Cited by the Examiner

UNITED STATES PATENTS

| 1,745,291 | 1/1930 | Bleil | 259—9 |
| 2,125,455 | 8/1938 | McLean | 259—9 |
| 2,762,790 | 9/1956 | Green | 260—763 |
| 2,807,600 | 9/1957 | Newton et al. | 260—41.5 |
| 2,821,516 | 1/1958 | Wolf | 260—41.5 |
| 3,055,856 | 9/1962 | Sutherland | 260—763 |

FOREIGN PATENTS 158,769  9/1954  Australia.

MORRIS, LIEBMAN, *Primary Examiner.*

LESLIE H. GASTON, *Examiner.*

K. CLARKE, J. S. WALDRON, *Assistant Examiners.*